United States Patent [19]

Moledina

[11] Patent Number: 6,020,908
[45] Date of Patent: *Feb. 1, 2000

[54] METHOD AND STRUCTURE FOR MODULATION IN A LASER PRINTER

[75] Inventor: Riaz A. Moledina, Woodside, Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/306,786

[22] Filed: Sep. 15, 1994

[51] Int. Cl.[7] ............................ B41J 2/47; B41J 2/435; G02B 26/02; G03B 27/72
[52] U.S. Cl. .......................... 347/246; 347/255; 347/251
[58] Field of Search ............................. 358/298, 347, 358/445, 455, 300, 302, 296; 347/246, 255, 184, 251

[56] References Cited

U.S. PATENT DOCUMENTS

| | | | |
|---|---|---|---|
| 4,814,886 | 3/1989 | Kuge et al. | 358/298 |
| 5,017,944 | 5/1991 | Kitamura et al. | 347/252 |
| 5,029,227 | 7/1991 | Kawamura | 358/445 |
| 5,432,611 | 7/1995 | Haneda et al. | 358/298 |
| 5,467,422 | 11/1995 | Itihara et al. | 358/298 |
| 5,486,927 | 1/1996 | Koizumi et al. | 358/298 |

*Primary Examiner*—John Barlow
*Assistant Examiner*—Raquel Yvette Gordon
*Attorney, Agent, or Firm*—Nancy R. Simon

[57] ABSTRACT

A method and structure for a printing system for a laser printer is provided including a data storage area containing a plurality of separate waveform signals. A controller selects a particular waveform signal to modulate the signal input to the system laser diode switch element to generate a halftone cell or a resolution enhancing cell with desired gray scale pixels. The digital laser signal from the printer controller is passed through a digital-to-analog converter circuit to a comparator circuit. The particular waveform selected from the data storage area is also applied to the comparator circuit to modulate the output signal from the digital-to-analog converter. The analog modulated signal from the comparator circuit has an analog value that maintains the laser diode switch element "on" to provide sub-pixels for the particular pixel gray level that is desired.

45 Claims, 16 Drawing Sheets

CENTER GROWTH

GROWTH FROM THE LEFT

GROWTH FROM THE RIGHT

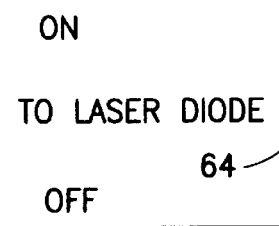
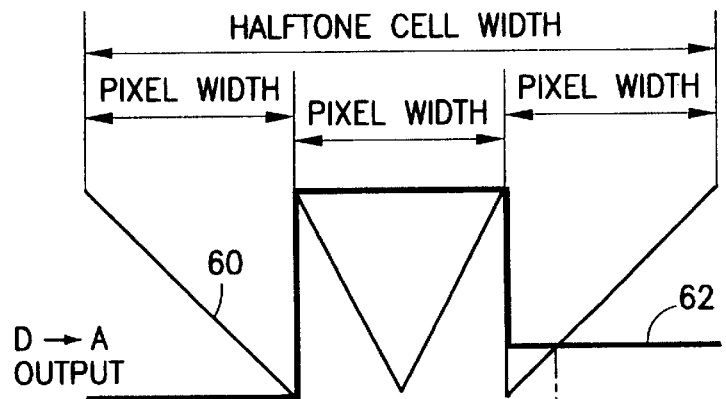
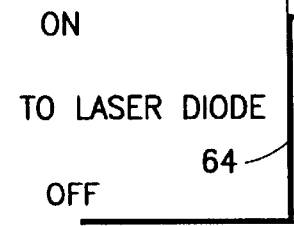
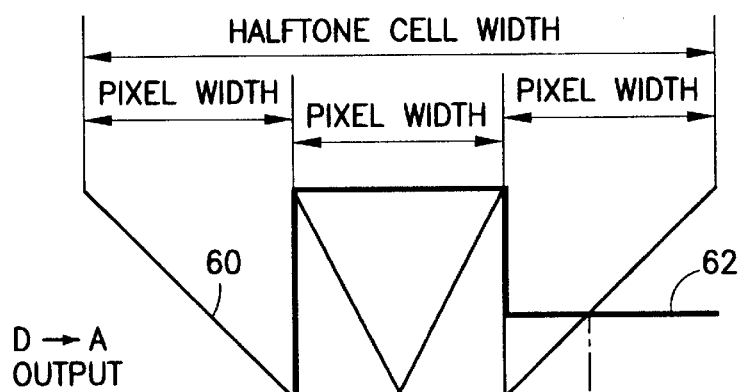

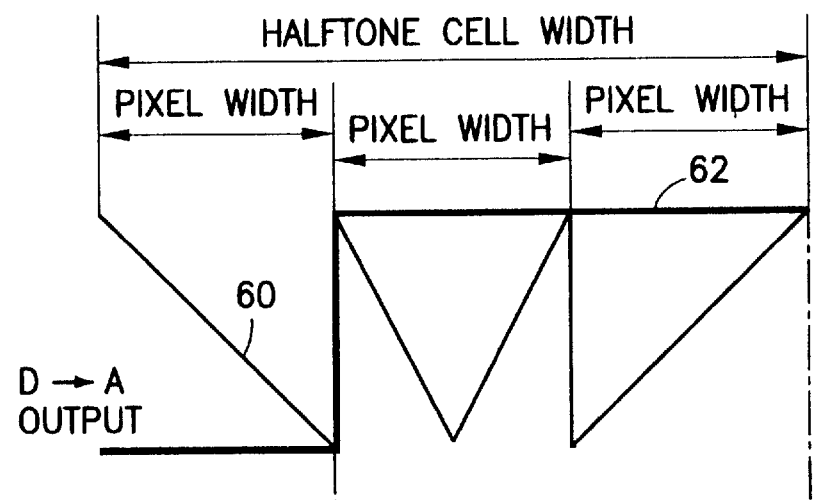

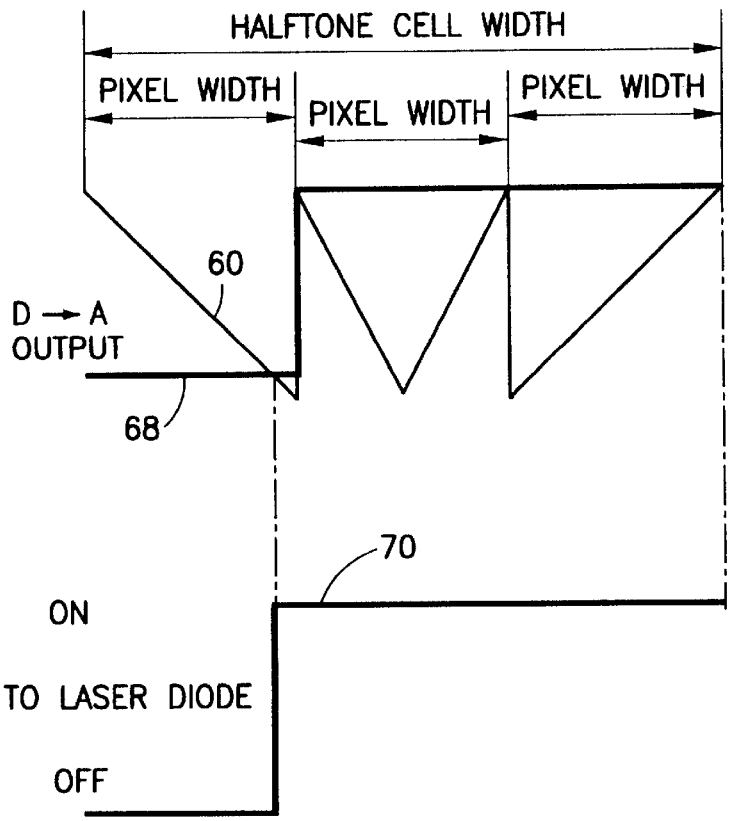
FIG. 51
FIG. 52
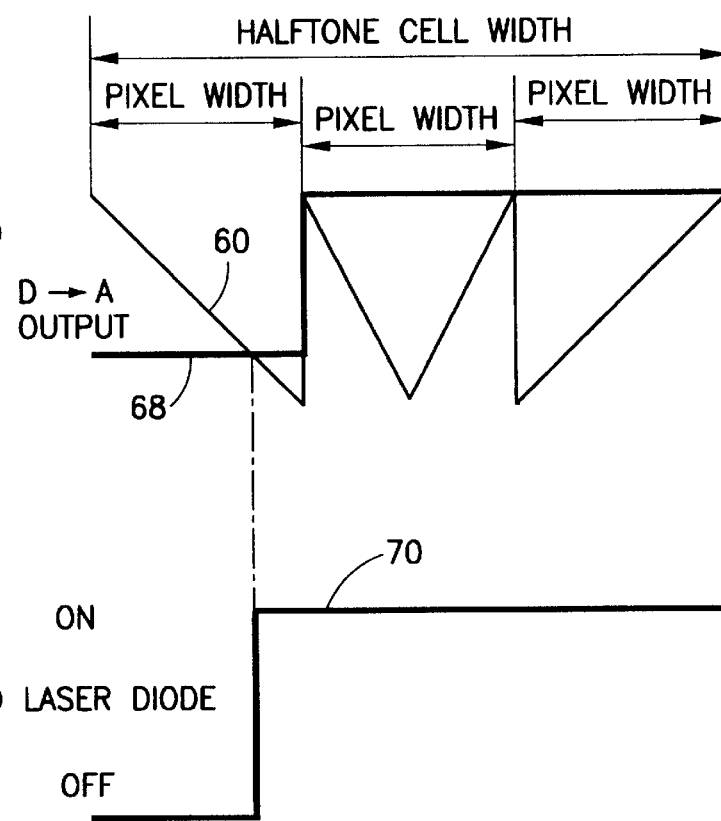
FIG. 53
FIG. 54

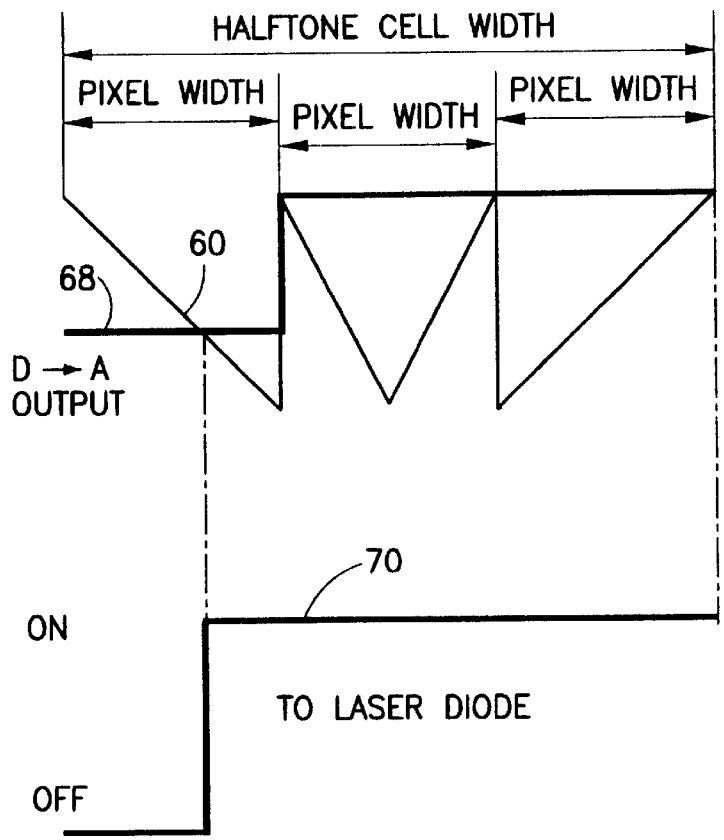
FIG. 55
FIG. 56
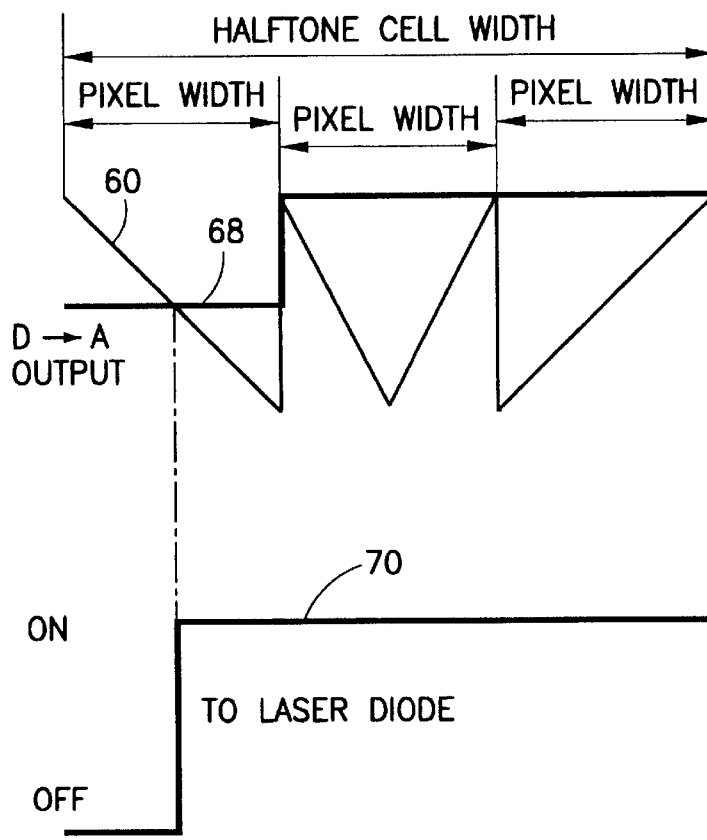
FIG. 57
FIG. 58

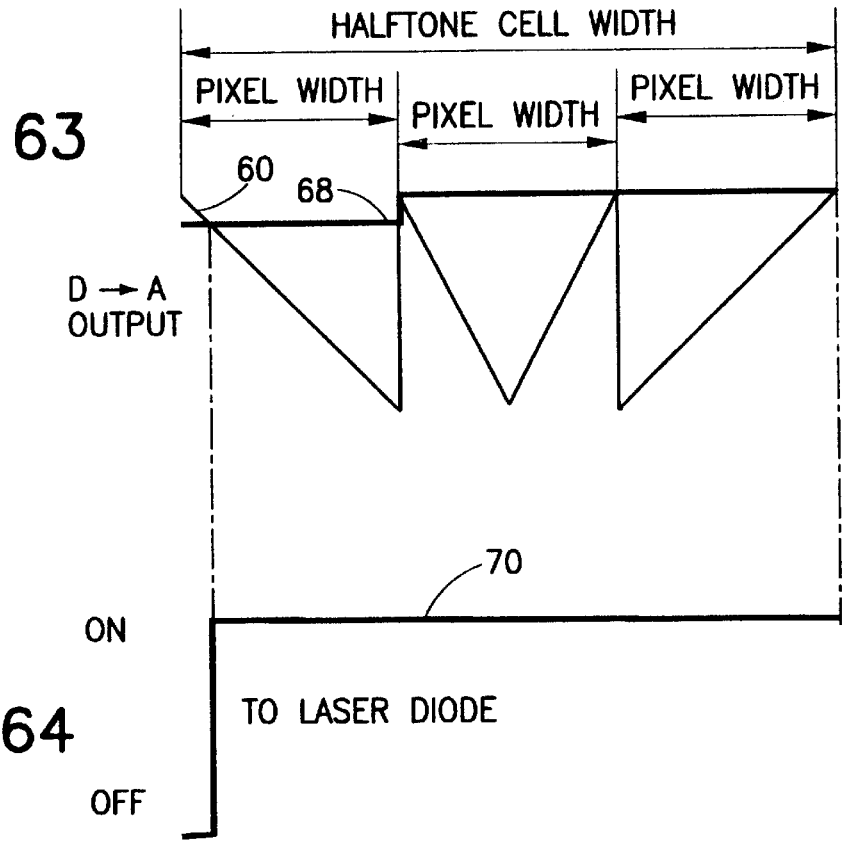
FIG. 63
FIG. 64
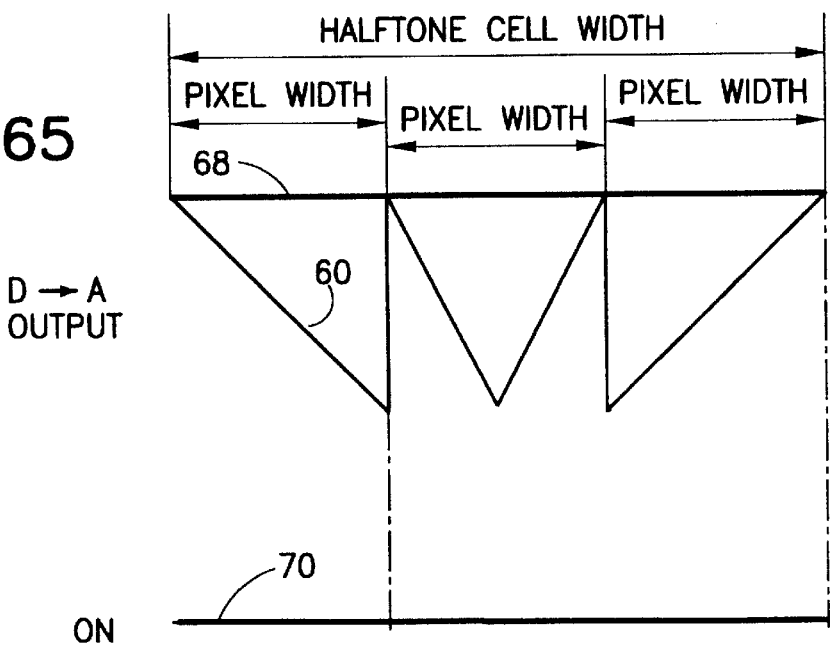
FIG. 65
FIG. 66

METHOD AND STRUCTURE FOR MODULATION IN A LASER PRINTER

BACKGROUND OF THE INVENTION

1. Field of the Invention

The present invention relates to halftone printing in laser printers and more particularly to an improved modulation structure and method for generating halftones dots.

2. Description of the Prior Art

In addition to improvements in the chemistry and physics of drums and toners, a critical factor in improving the quality of the output of laser printers is to improve the imaging capability by techniques to control the laser beam in the printer engine.

Early laser printers can only turn entire pixels completely on or completely off. To print contone images, halftoning techniques have to be applied. A common technique of halftoning is the use of halftone screening with clustered dot spot functions. The amount of gray gradation obtained through said technique depends on the size of the halftone screen. More gray values can be presented by increasing the size of the halftone screen. However, as the screen is made larger, the underlying cluster dot pattern becomes more noticeable and more objectionable to the eye.

Later laser printers allowed the control of the laser beam to be finer than complete pixels. This property was exploited in two directions. The first direction was the improvement in the number of gray levels one can obtain with clustered dot halftoning of contone images. The second direction was to exploit the more precise control for the resolution enhancement of text and graphics through anti-aliasing techniques.

The aforesaid methods require precise control of the size of a subpixel (as determined by the laser beam width) as well as the position of the subpixel within the pixel.

Existing digital techniques for modulating the laser beam permit such size and position control when the size and position increments are relatively large. Previously known analog modulation techniques allow precise control of the dot size, but not position control.

Conventional laser printers are bi-level devices. The laser beam is turned on or off only at pixel boundaries. For a halftone cell consisting of n pixels, n+1 grays are possible. For example, for an 8 pixel cell, there are 9 possible gray levels. One possible sequence of turning on the pixels known as the "spot function" is shown in FIGS. 1 through 9. The nine possible gray levels are generated by clocking through the pixel data in conventional raster format at the pixel frequency as illustrated in FIG. 10.

FIG. 10 illustrates a typical prior art laser printer subsystem without subpixel modulation wherein the printer controller shift register 10 is triggered by the pixel clock on lead 12 to apply the video signal to modulate laser diode 26 on and off.

One known digital modulation technique provides gating a pixel into m sub-pixels along the direction of the laser scan, such that up to (nxm)+1 grays are possible. For instance for m=8, the possible grays between the pixels of FIGS. 2 and 3 are illustrated in FIGS. 11 through 19.

The width and position of a pixel are controlled to 1/m of a pixel. This can be implemented by clocking the data to the engine at m times the pixel rate as shown in FIG. 20. This allows m incremental gray values between each of the steps in FIGS. 1–9. FIGS. 11–19 show how the single step from FIG. 2 to FIG. 3 is refined into multiple gray steps.

Thus, more gray gradations can be accomplished by increasing the number of subpixel slices. In practice, there is a limit on how fine one can gate the subpixel slices. Due to inevitable noise pickup between circuit modules, there is a limit on how well the position and the slew rate of pulse edges can be controlled in a consistent and unvarying fashion. Another limiting factor is how fast the switching rate needs to be increased to before such rates become impractical with today's circuit components and methodology.

In a typical analog modulation technique, a free running, fixed frequency triangular waveform is generated by the modulator circuit. As illustrated in FIG. 21, a digitally encoded gray value is converted to an analog signal representing the said gray value by passing it through a digital-to-analog converter. This resulting analog signal is compared with the aforementioned triangular waveform. The bilevel modulating signal to the laser diode is derived by comparing the said analog gray signal to the said triangular wave signal. With existing implementations, the triangular wave signal's period can span multiple pixels; this allows the necessary gray gradiations to be realized without over stressing the capabilities of the electrophotography process. The sawtooth waveform and resultant variable width pulse signal are illustrated in FIGS. 22 and 23, respectively. In some implementations, the width of the triangular waveform spans the width of several pixels to allow more gray levels.

This encoded scheme allows up to $2^p$ levels of gray per pixel, eliminating the bandwidth problems with the decoded digital approach. However, note that each subpixel necessarily grows from the pixel's center. As previously mentioned, this means there is no way to control a subpixel's position and such analog scheme therefore does not lend itself to the aforementioned techniques of enhancing image halftones and the apparent resolution of text and graphics.

SUMMARY OF THE INVENTION

An object of the present invention is to provide structure methods for modulating a laser beam in a laser printer to provide high quality images.

Another object of the present invention is to provide a variable laser beam modulating structure and method which permits the enhancement of clustered dot halftones and the enhancement of edges in text and graphical objects.

A further object of the present invention is to provide a laser beam modulating structure and method wherein the laser printer video beam is modulated with a circuit that uses a plurality of different analog waveforms to precisely control the width and position of subpixels.

BRIEF DESCRIPTION OF THE DRAWINGS

The above set forth and other features of the invention are made more apparent in the ensuing Detailed Description of the Invention when read in conjunction with the attached drawings, wherein:

FIG. 32 through 50 illustrate a series of waveforms that show how halftones are created by pixel growth to the right.

FIGS. 51 through 66 illustrate a series of waveforms that show how halftones are created by pixel growth to the left.

DESCRIPTION OF A PREFERRED EMBODIMENT

Figure 1:
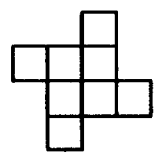
FIGS. 1 through 9 illustrate nine gray halftones possible with an eight pixel cell.
Figure 2:
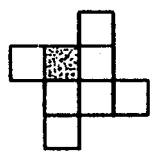
Figure 3:
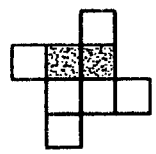
Figure 4:
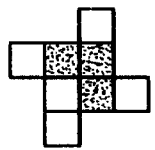
Figure 5:
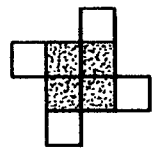
Figure 6:
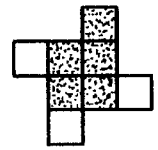
Figure 7:
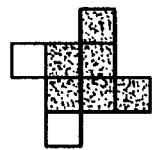
Figure 11:
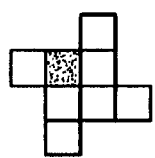
FIGS. 11 through 19 illustrate how further gray halftones can be provided by dividing a pixel into sub-pixels.
Figure 12:
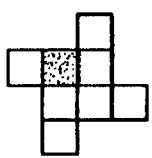
Figure 19:
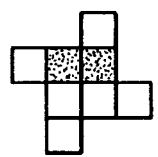

Referring to FIG. 1, an eight pixel cell that can be generated by the beam of a laser printer is shown. In FIG. 2, the eight pixel cell is shown having a halftone content illustrated by one black pixel. FIG. 3 illustrates a slightly darker halftone cell composed of two black pixels. FIG. 11 shows the pixel of FIG. 2, FIG. 19 shows the pixel of FIG. 3, and FIGS. 12 through 19 show further halftones that can be obtained between the cells of FIGS. 2 and 3 by employing digital modulation techniques for subdividing a pixel into eight sub-pixels and "growing" the black sub-pixels by ⅛ width increments at positions illustrated in FIGS. 12 through 18.

The particular shape of the halftone cell as well as it being shown with eight incremented sizes is only for example. The shape of the halftone cell, the number of pixels in the cell and the number of subpixels in a pixel can vary in different embodiments and does not limit the inventions.

Figure 20:
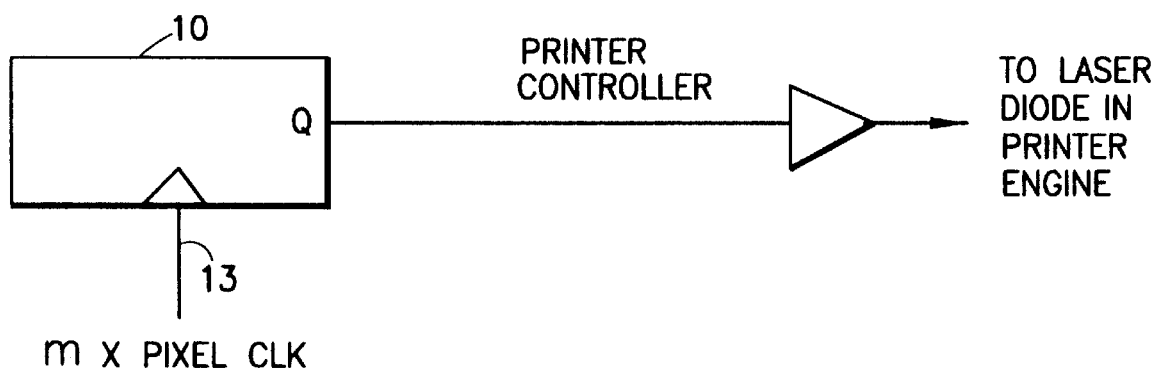
FIG. 20 is a schematic illustration of a prior art structure for producing the halftones cells of FIGS. 11 through 19.

Generally, if n equals the number of pixels in the cell and m equals the number of sub-pixels in a pixel, then (nXm)+1 different gray halftones are possible. In prior use of digital modulation techniques, the pulse width and position of the pulse used for switching the laser beam in a printer is controlled to a resolution 1/m of a pixel. An embodiment of this is shown in FIG. 20; the desired data is loaded into register 10, and the shift register 10 is clocked with a high speed clock, lead 13, which has a rate m times the rate of the pixel clock.

With the embodiment of the digital modulation technique described in the previous paragraph, the precision of the pulse is limited by noise, switching rates and slew rates of the electrical circuits. This, therefore, determines the maximum slices, m, which can practically be used to implement the scheme. This, in turn, controls the amount of enhancement which can be applied to halftoned images and to enhancing edges of text and graphics.

Figure 21:
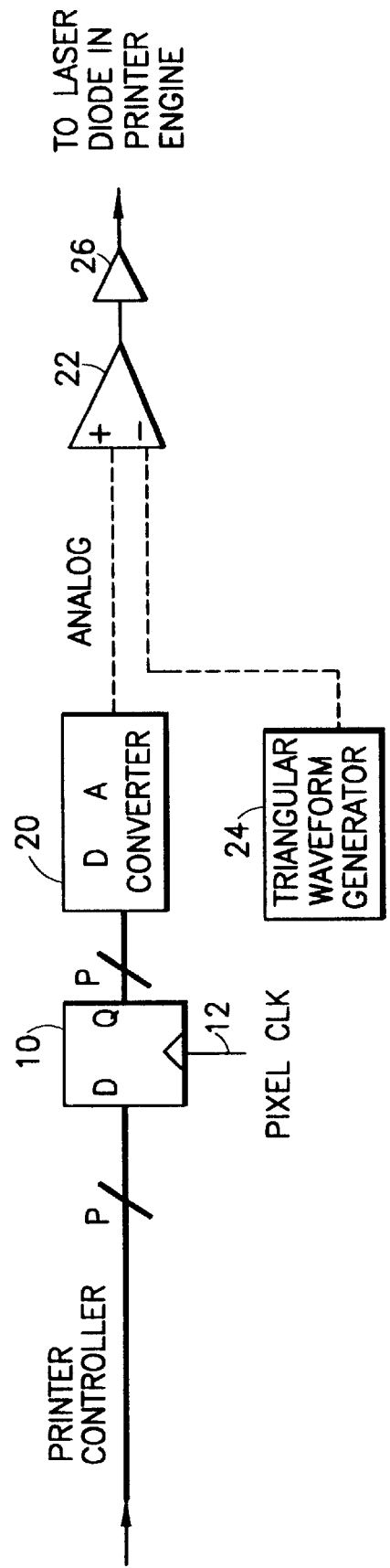
FIG. 21 is a schematic illustration of a prior art structure for analog modulating the laser printer beam signal with a triangular waveform.

Using analog modulation techniques large numbers of gray levels per pixel can be produced using encoded variable width pulses sent to the laser diode of the printer. A typical analog technique is illustrated in FIG. 21 wherein the digital control signal is converted to an analog signal by the digital-to-analog converter circuit 20. As shown in FIG. 21, a new p-bit wide digital signal which represents the gray value for a pixel applied to register 10 each time the register receives a pixel clock 12. The digital output of said register is converted to an analog signal which represent the same gray level using the digital-to-analog converter 20. Meanwhile, the triangular wave generator 24 generates a varying threshold with which the analog signal representing the gray value is compared against. The output of the comparator 22 is a bilevel signal that is used to drive the laser diode through driver circuitry 26. This bilevel signal will be pulses whose width is proportional to gray level of the p-bit wide digital signal.

Figures 22, 23:
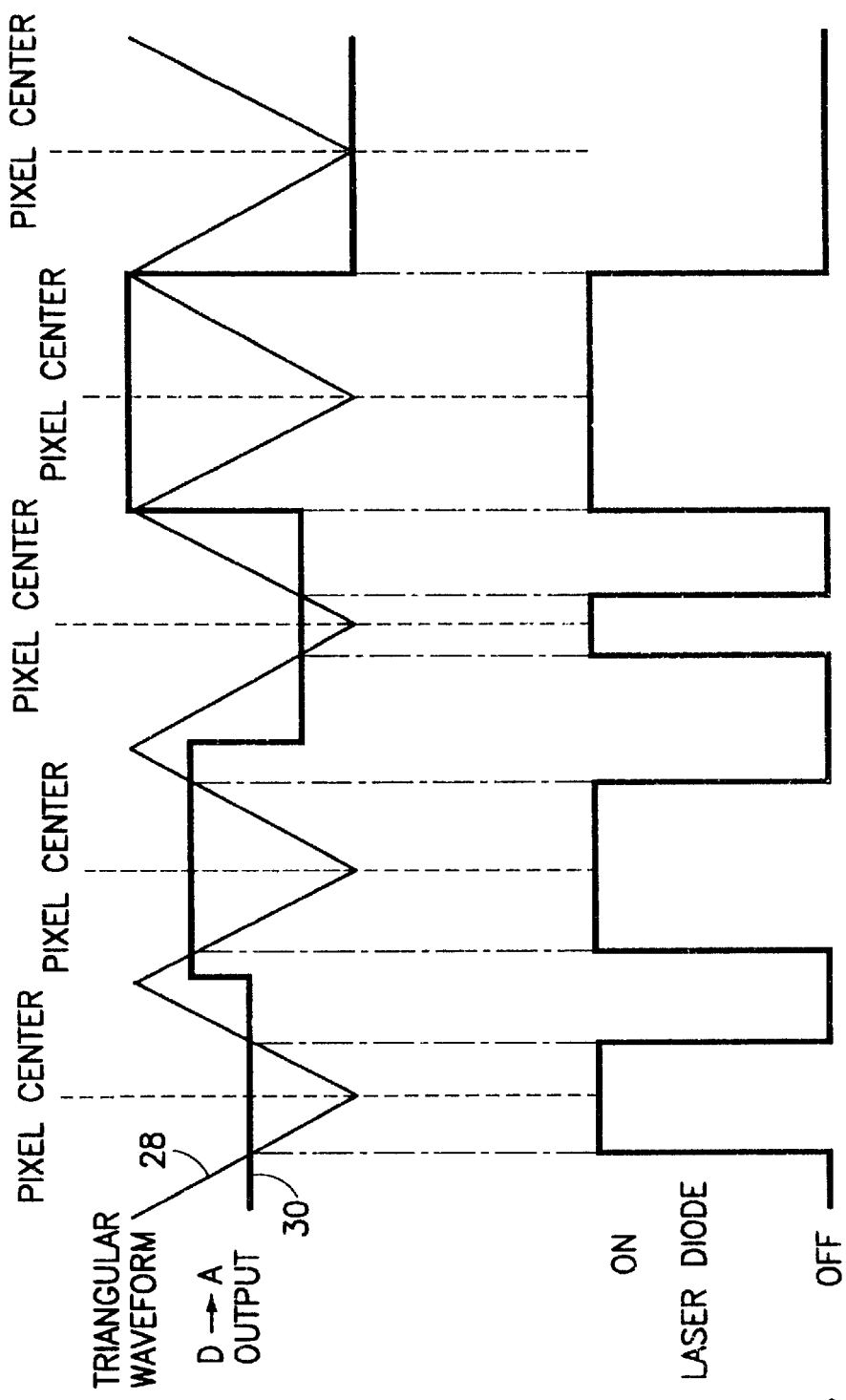
FIGS. 22 and 23 are illustrations of the conventional triangular waveform used in the structure of FIG. 21 and the resultant variable width pulse signal respectively.

Referring to FIG. 22, the fixed triangular waveform 28 is shown with the output signal waveform 30 from digital-to-analog converter circuit 20. FIG. 23 shows the resultant waveform 32 from comparator circuit 22 that is sent to the laser diode. The widths of the pulses of waveform represent the different gray scales per pixel. The technique shown in FIGS. 21, 22 and 23 allows up to $2^p$ levels of gray per pixel, eliminating the bandwidth problems of the digital modulation method. However, in FIGS. 22 and 23 it should be noted that each sub-pixel "grows" from each pixel's center. There is no way to change or control a sub-pixel's position within the pixel. This is a limitation and a drawback particularly in halftoning and resolution enhancement techniques.

For the present invention, instead of using a single triangular waveform, a plurality of waveforms are generated from previously computed values, or values that are computed on-the-fly. From this plurality of waveforms, a specific one is chosen as the reference threshold with which to compare the analog signal that represents the current gray pixel value.

Figure 30:
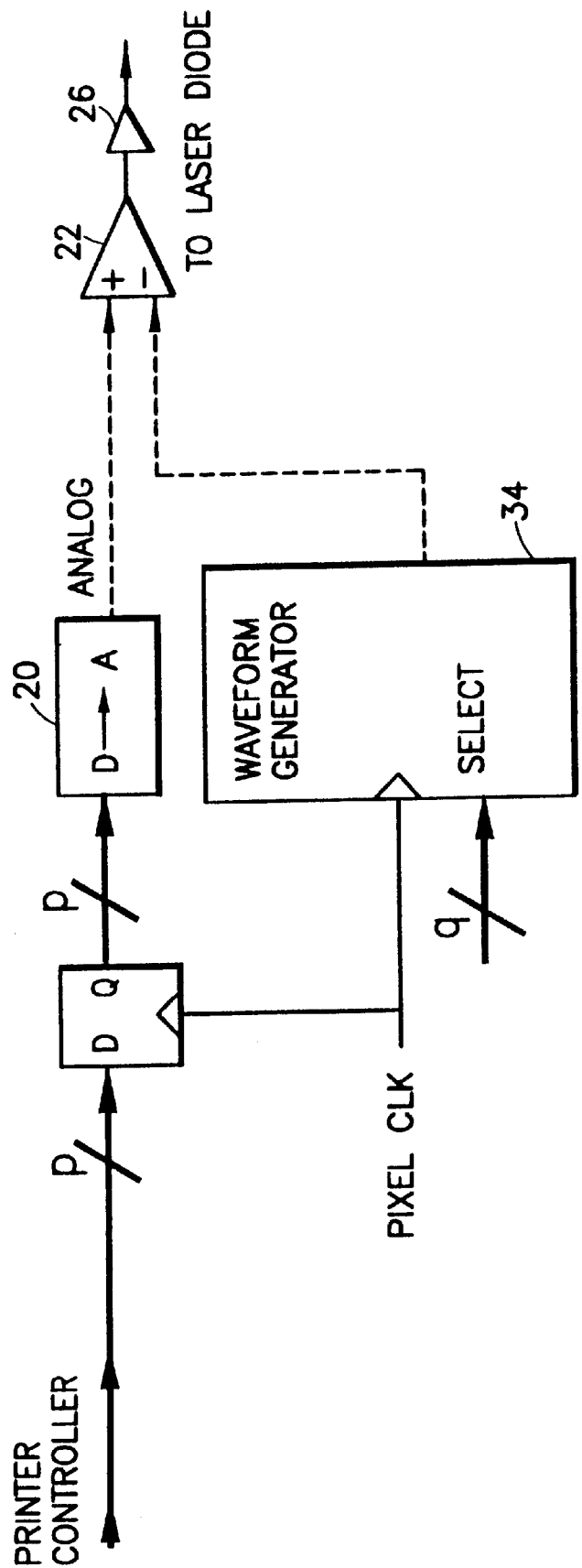
FIG. 30 is a schematic block diagram of structure for producing the analog modulation technique illustrated in FIGS. 24 through 29.

Referring to FIG. 30, a schematic block diagram of a system for the analog modulation of a laser printer signal for generating separate sub-pixels having grey levels, when the grey levels grow in a selected direction in a row of pixels in a halftone cell.

In FIG. 30, the same digital printer signal is received from the laser printer controller as in the prior art system of FIG. 21. The triangular generator circuit 24 of FIG. 21 is eliminated and in FIG. 30 a data storage means 34 includes stored therein a plurality of separate waveform signals. Particular ones of the plurality of separate waveform signals are selected by control means within data storage means 34 to provide particular analog modulation depending on the desired resultant grey scale halftone cell. Examples of various stored waveforms are discussed relative to FIGS. 24 through 29. Data storage means 34, because it can generate selected ones of a plurality of stored waveforms as determined by a selection signal q, is also referred to as a waveform generator.

The selection of a stored waveform at each pixel position by the selection signal can be carried out in a number of different ways.

In one technique, as shown in FIG. 30 in addition to the controller providing p bits to the D-to-A converter 22, it also provides q bits to the Select logic of the Waveform Generator 34. These q bits could specify one of $2_q$ possible waveforms. The selection is under higher level control.

In another selection technique, by looking at the pixels surrounding the current pixel to be imaged (left and right, and perhaps top and bottom as well), logic can be used to select the waveform to use for the current pixel. For instance, if the current pixel is gray (to be subpixelly modulated) and one of the adjacent (left or right) pixels is black, this subpixel would be grown from the direction of the black pixel. Or else, if the top or bottom pixel is black, it may be desirable to select a different waveform. If no adjacent pixel is black, yet another waveform may be selected to grow the halftone cell.

Figure 33:
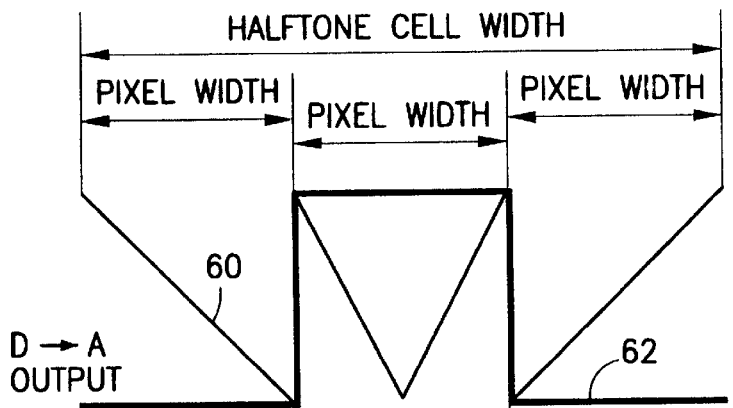

In a third selection technique, by using the x and y coordinates of the current pixel, hardware logic can be used to select the waveform. This may be used for halftone spot functions that are known in advance. Such as illustrated in FIG. 33 where in FIG. 33 on, you show a fixed sequence of waveforms is repeated every 3 pixels.

Figure 24:
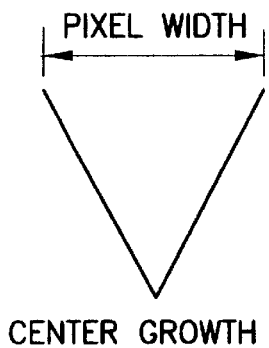
FIGS. 24 through 29 are illustrations of different waveforms which are employed for modulating separate pixels according to the principles of the present invention.

Referring to FIGS. 24 through 29, examples of different waveforms employed in an embodiment of the present invention are illustrated. In FIG. 24, a triangular waveform of one pixel width duration similar to the triangular waveform of FIG. 22 is selected and used to place the image dot in the middle of the pixel. After this pixel is complete, the next and following pixels can grow from this nucleus on its left or its right side.

Figure 25:
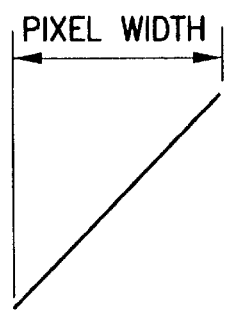
Figure 26:
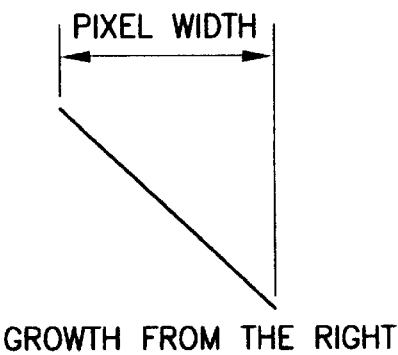
Figure 27:
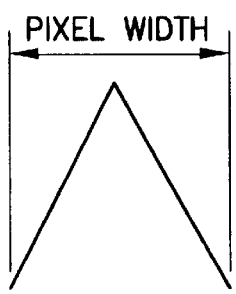
Figure 28:
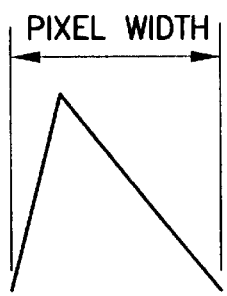
Figure 29:
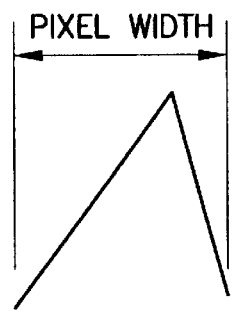
Figure 31:
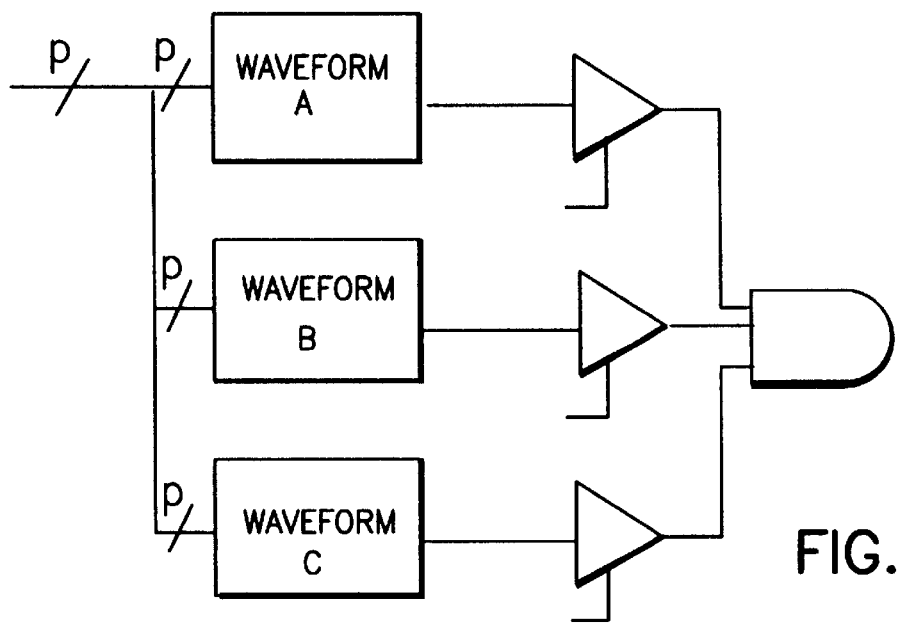
FIG. 31 is a schematic block diagram of structure using a plurality of comparator circuits for carrying out the present invention.

The waveform selected to create pixels growing to the left is shown in FIG. 25 and the waveform selected to create pixels growing to the right is shown in FIG. 26.

Figure 32:
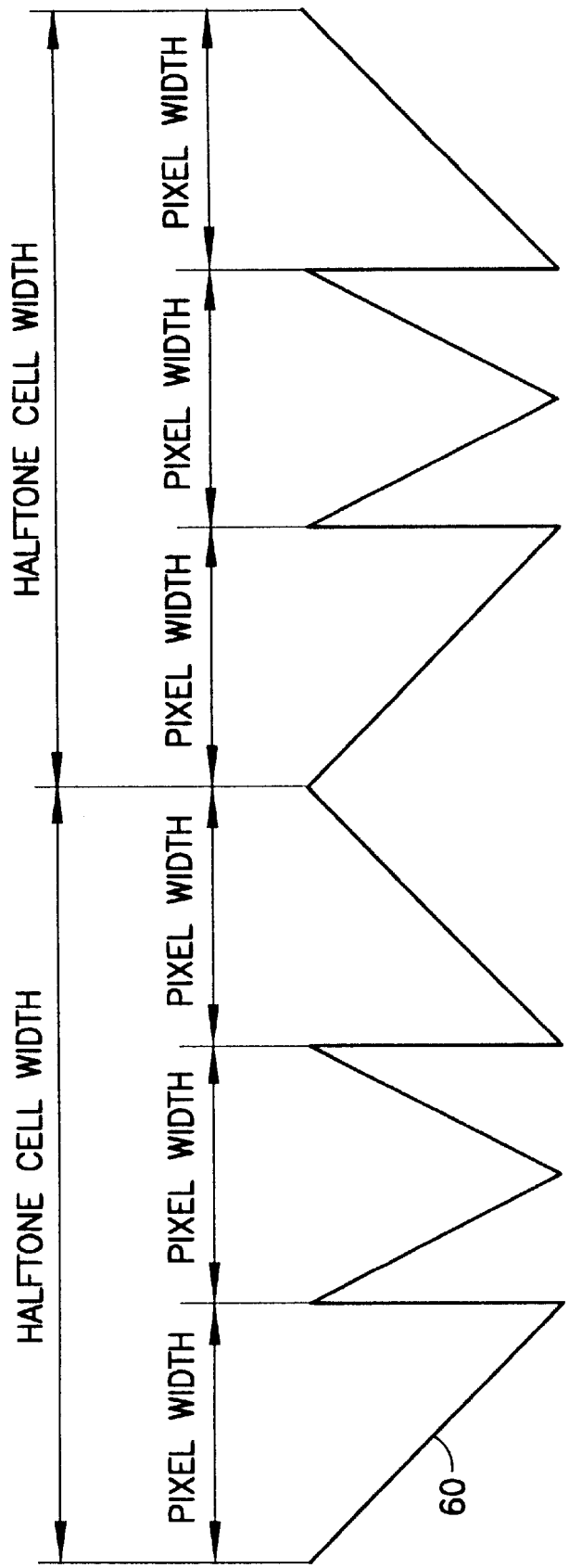

More particularly, in order to produce a pixel growth to the right as illustrated in the three pixel widths of the second row from the top in the halftone cell illustrated in FIGS. 11 through 19, an analog waveform as shown in FIG. 32 may be selected from a memory structure instead of the prior art triangular waveform illustrated in FIG. 22. As in the explanation of FIGS. 22 and 23, the analog waveform 60 of FIG. 32 is used to modulate the analog signal 62 from the digital-to-analog converter 20 (FIG. 30). Analog waveform 60 of FIG. 32 is just one example of a sequence of waveforms that will work according to the principles of the present invention.

Figure 34:
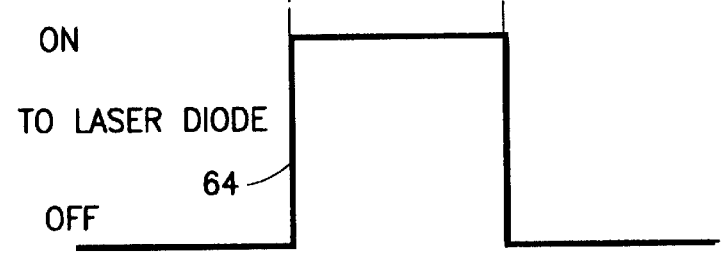

FIG. 33 shows the halftone cell width consisting of three pixel widths, the analog signal 62, and FIG. 34 shows the resultant waveform 64 produced when signal 60 is compared with signal 62. The signal depicted in the waveform 64 is applied to the laser diode of the printer.

Figure 35:
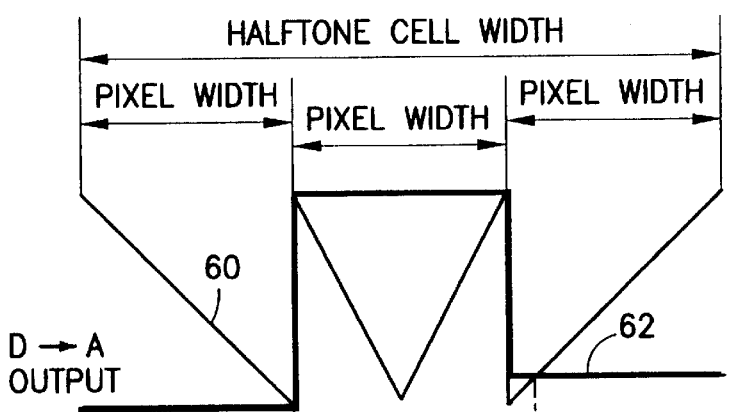
Figure 36:
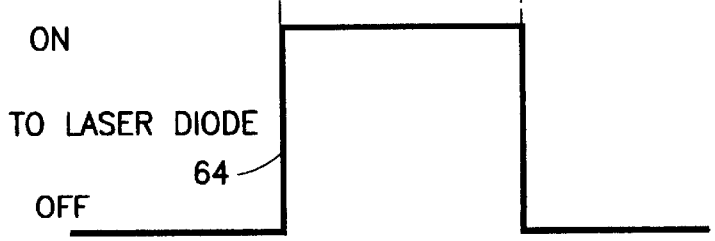
Figure 41:
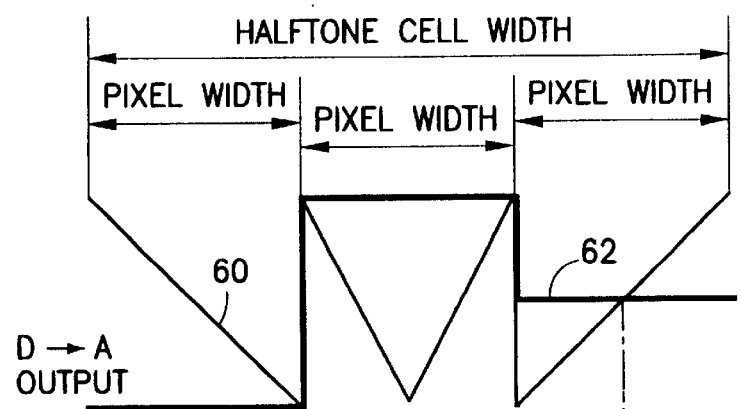
Figure 42:
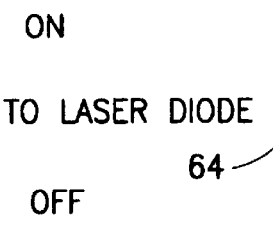
Figure 43:
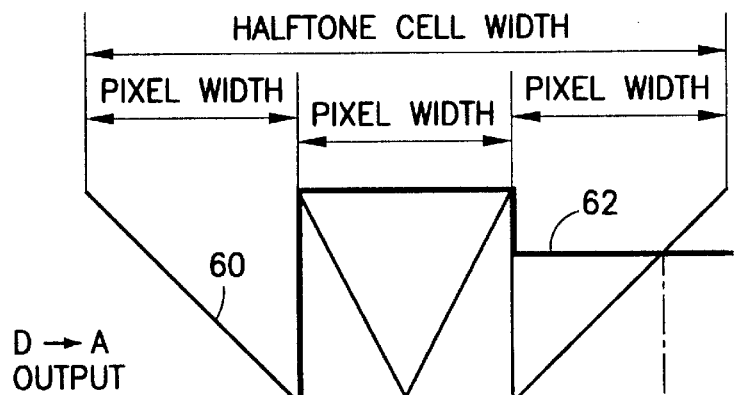
Figure 44:
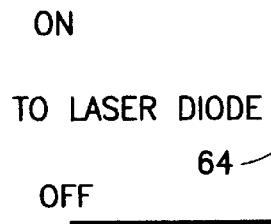
Figure 45:
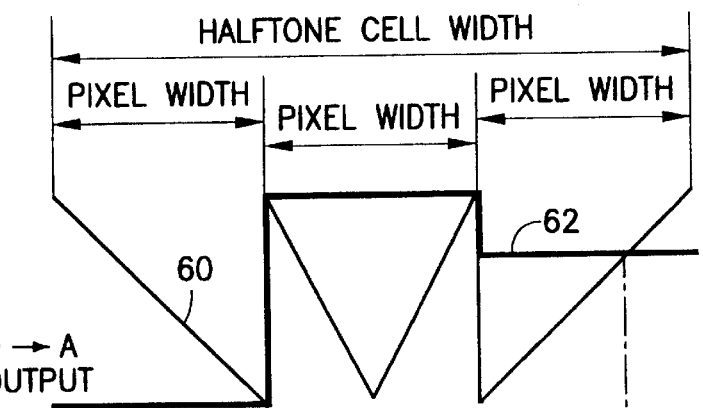
Figure 46:
Figure 47:
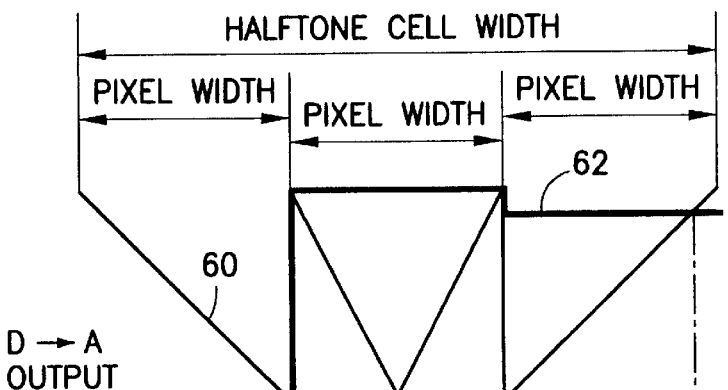
Figure 48:
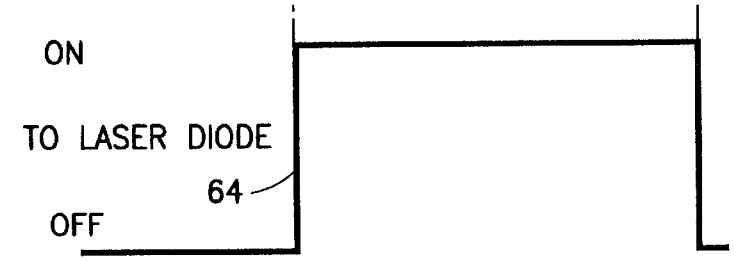
Figure 59:
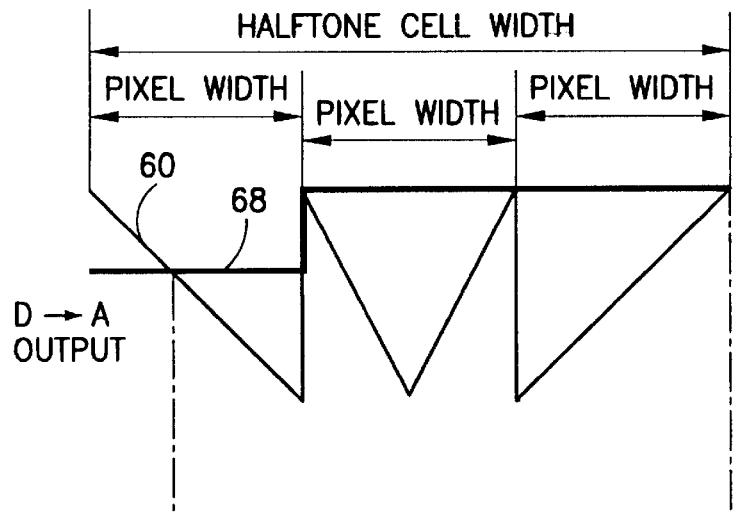
Figure 60:
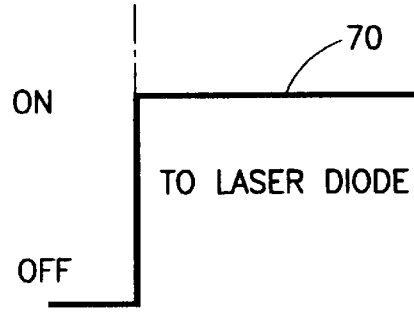
Figure 61:
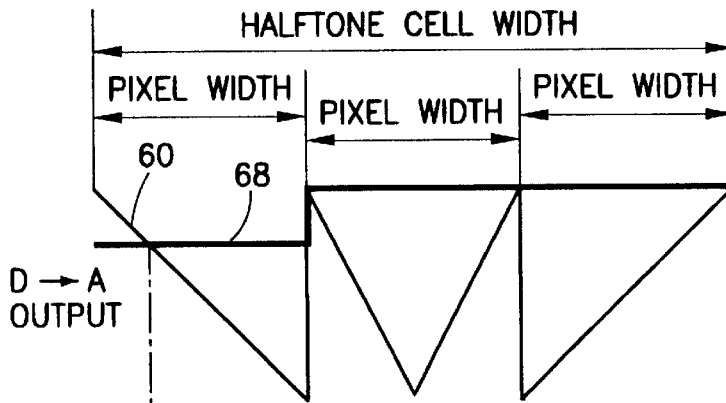
Figure 62:
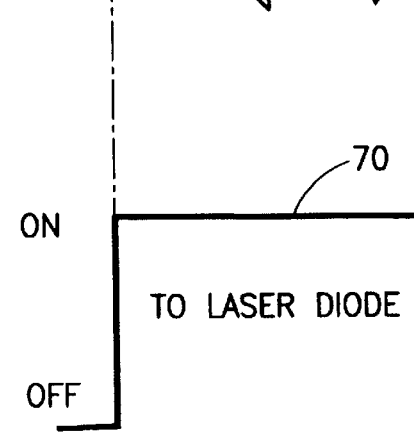

In FIGS. 35 and 36 the analog output signal changes in amplitude coincident with the right pixel width (FIG. 35) and the resultant signal 64 applied to the laser diode is widened, that is, it stays on longer as shown in FIG. 36. This results in the halftone cell shown in FIG. 12.

In FIG. 37, the analog signal 60 continues to vary coincident with the right pixel width, and when modulated by waveforms 60 produces the resultant waveform signal 64 of FIG. 38 that is applied to the laser diode.

Figure 13:
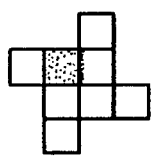
Figure 14:
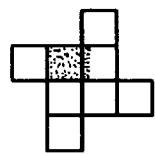
Figure 15:
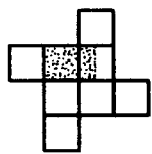
Figure 16:
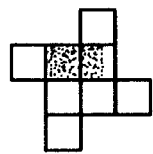
Figure 17:
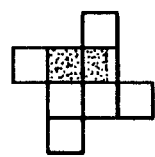
Figure 18:
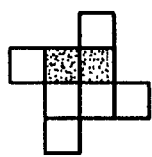

The halftone result is shown in FIG. 13. This process continues, that is, the amplitude level of analog waveform 62 coincident with the right pixel width of the cell continues to increase, and the resultant modulated signal 64 continues to widen and consequently keep the laser diode on for a longer time during the pixel width.

Finally, the condition illustrated in FIGS. 49 and 50 is reached wherein the resultant signal 64 keeps the laser diode on for the entire pixel width to produce the halftone condition shown in FIG. 19.

The modulation represented by the intermediate FIGS; 39 and 40, 41 and 42, 43 and 44, 45 and 46, and 47 and 48 result in the halftone cells illustrates in FIGS. 14, 15, 16, 17 and 18, respectively.

Figure 8:
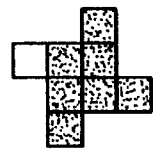
Figure 9:
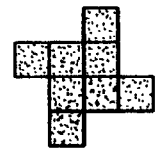
Figure 10:
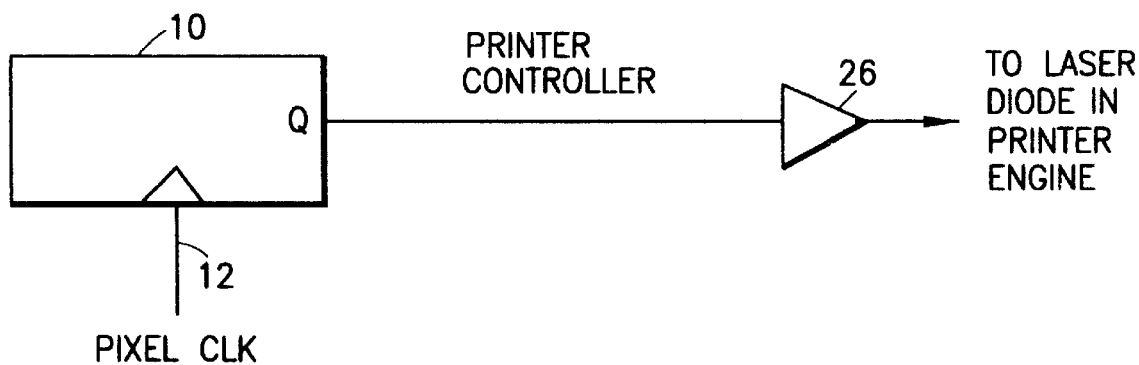
FIG. 10 is a schematic illustration of a prior art structure for producing the halftone cells of FIGS. 1 through 9.

FIGS. 51 and 52, 53 and 54, 55 and 56, 57 and 58, 59 and 60, 61 and 62, 63 and 64 and 65 and 66 similarly illustrate halftone pixel growth to the left as shown in FIGS. 8 and FIG. 9. It is to be appreciated that between FIG. 8 and FIG. 9 there are a series of intermediate halftones similar to those shown in FIGS. 12 through 18, but growing to the left.

In FIG. 51 the analog signal 68 from digital-to-analog converter 20 differs from analog signal 62 of FIGS. 33–49, however the analog modulating waveform signal 60 is the same. In halftone growth from the left, the analog signal 68 in the left pixel width changes in amplitude as shown in the series of FIGS. 51, 53, 55 . . . FIG. 65 and the resultant modulated signal 70 that is applied to turn the laser diode off and on correspondingly varies as shown in FIGS. 52, 54, 56 . . . FIG. 66. Note that in FIG. 66 the resultant analog signal 70 is high and maintains the laser diode on for the total duration time of the left pixel width of the halftone cell, the condition illustrated in FIG. 9.

While the invention has been described in connection with a preferred embodiment, it is not intended to limit the scope of the invention to the particular form set forth, but, on the contrary, it is intended to cover such alternatives, modifications, and equivalence as may be included within the spirit and scope of the invention as defined in the appended claims.

What is claimed is:

1. A printing system for modulating a printer signal for generating separate sub-pixels having sub-pixel gray levels, wherein the system comprises at least one digital input printer signal that defines at least one pixel having a gray level, the system comprising:

a digital-to-analog converter circuit connected to the at least one digital input printer signal for converting the at least one digital input printer signal into an at least one analog printer signal having a signal amplitude level representative of the gray level for the at least one pixel defined in the digital input printer signal;

a data storage means for storing a plurality of separate waveform signals, each of the separate waveform signals defining a separate waveform shape;

means for selecting at least one of the plurality of waveform signals as an output signal from the data storage means for each pixel; and a comparator circuit connected to an output of the digital-to-analog converter circuit and to the output signal of the data storage means, wherein the comparator circuit modulates the at least one analog printer signal by the output signal from the data storage means to produce a modulated output signal whereby separate sub-pixels having sub-pixel gray levels are generated for each pixel and the width and position of the sub-pixels within a pixel are controlled by the shape of the at least one selected waveform for that pixel.

2. The printing system of claim 1, wherein the modulated output signal from the comparator circuit is connected to a laser diode switch element.

3. The printing system of claim 2, wherein each of the plurality of separate waveform signals stored in the data storage means is a linear waveform signal for defining a separate linear waveform shape and orientation.

4. The printing system of claim 3, wherein the laser diode switch element can be placed in an "on" state and in an "off" state, and wherein the signal duration of the modulated output signal maintains the laser diode switch element in the "on" state for a time period that is proportional to the width of a sub-pixel.

5. The printing system of claim 4, wherein the sub-pixel gray levels for a pixel increase in a left-to-right direction.

6. The printing system of claim 4, wherein the sub-pixel gray levels for a pixel increase in a right-to-left direction.

7. The printing system of claim 4, further comprising means for combining a plurality of pixels to comprise at least one cell, wherein the modulated output signal provides a sequence of signals having amplitudes of increasing time duration to the laser diode element to maintain the laser diode element in the "on" state, wherein each of a plurality of successive pixels in a row of the cell contain increasing amounts of sub-pixel gray levels.

8. The printing system of claim 7, wherein the sub-pixel gray levels for the successive pixels in the row increase in a left-to-right direction.

9. The printing system of claim 7, wherein the sub-pixel gray levels for the successive pixels in the row increase in a right-to-left direction.

10. A method for modulating a printer signal for generating separate sub-pixels having sub-pixel gray levels, comprising the steps of:
receiving at least one digital input printer signal that defines at least one pixel having a gray level;
converting the at least one digital input printer signal into an at least one analog printer signal having a signal amplitude level representative of the gray level for the at least one pixel defined in the digital input printer signal;
selecting at least one of a plurality of waveform signals stored in a data storage means for each of said at least one pixel, wherein each of the separate waveform signals defines a separate waveform shape; and
modulating the at least one analog printer signal with the at least one selected waveform to produce a modulated output signal whereby separate sub-pixels having sub-pixel gray levels are generated for each of said at least one pixel and a width and position of the sub-pixels within a pixel are controlled by the shape of the at least one selected waveform for that pixel.

11. The method of claim 10, further comprising the step of storing the plurality of separate waveform signals in the data storage means.

12. The method of claim 11, wherein each of the plurality of separate waveform signals stored in the data storage means is a linear waveform signal for defining a separate linear waveform shape and orientation.

13. The method of claim 12, further comprising the step of placing a laser diode switch element in an "on" state or an "off" state based upon the modulated output signal produced by modulating the at least one analog printer signal with at least one selected waveform from the plurality of separate waveform signals, wherein a signal duration of the modulated output signal maintains the laser diode switch element in the "on" state for a time period that is proportional to the width of a sub-pixel.

14. The method of claim 10, wherein the step of selecting at least one of a plurality of waveform signals comprises the step of selecting at least one of a plurality of waveform signals such that the at least one selected waveform signal causes the sub-pixel gray levels for a pixel to increase in a left-to-right direction.

15. The method of claim 10, wherein the step of selecting at least one of a plurality of waveform signals comprises the step of selecting at least one of a plurality of waveform signals such that the at least one selected waveform signal causes the sub-pixel gray levels for a pixel to increase in a right-to-left direction.

16. The method of claim 13, further comprising the step of combining a plurality of pixels to comprise at least one cell, wherein the modulated output signal provides a sequence of signals having amplitudes of increasing time duration to the laser diode element to maintain the laser diode element in the "on" state, wherein each of a plurality of successive pixels in a row of the cell contain increasing amounts of sub-pixel gray levels.

17. The method of claim 16, wherein the sub-pixel gray levels for the successive pixels in the row increase in a left-to-right direction.

18. The method of claim 16, wherein the sub-pixel gray levels for the successive pixels in the row increase in a right-to-left direction.

19. The method of claim 16, wherein the step of combining a plurality of pixels to comprise at least one cell wherein each of a plurality of successive pixels in a row of the at least one cell contain increasing amounts of sub-pixel gray levels comprises the step of combining a plurality of pixels to comprise at least one cell wherein each of a plurality of successive pixels in a row of the at least one cell contain increasing amounts of sub-pixel gray levels such that the sub-pixel gray levels for a pixel in the at least one cell increase in a right-to-left direction.

20. The method of claim 16, wherein the step of combining a plurality of pixels to comprise at least one cell wherein each of a plurality of successive pixels in a row of the at least one cell contain increasing amounts of sub-pixel gray levels comprises the step of combining a plurality of pixels to comprise at least one cell wherein each of a plurality of successive pixels in a row of the at least one cell contain increasing amounts of sub-pixel gray levels such that the sub-pixel gray levels for a pixel in the at least one cell increase in a left-to-right direction.

21. A printing system for modulating a printer signal for generating separate sub-pixels having sub-pixel gray levels, wherein the system comprises at least one digital input printer signal that defines at least one pixel having a gray level, the system comprising:
means for converting the at least one digital input printer signal into an at least one analog printer signal having a signal amplitude level representative of the gray level for the at least one pixel defined in the digital input printer signal;
a waveform generator for generating a plurality of separate waveform signals, wherein each of the separate waveform signals defines a waveform having an at least one separate waveform characteristic;
means for selecting at least one of the plurality of waveform signals as an output signal from the waveform generator for each pixel; and
means for modulating the at least one analog printer signal by the output signal from the waveform generator to produce a modulated output signal whereby separate sub-pixels having sub-pixel gray levels are generated for each of said at least one pixel and a width and position of the sub-pixels within a pixel are controlled by the at least one separate waveform characteristic of the at least one selected waveform for that pixel.

22. The printing system of claim 21, wherein the at least one waveform characteristic is comprised of waveform shape and orientation.

23. The printing system of claim 21, wherein the waveform generator is comprised of a data storage means that store a plurality of separate waveforms having an at least one separate waveform characteristic.

24. The printing system of claim 21, wherein the modulated output signal from the modulating means is connected to a laser diode switch element.

25. The printing system of claim 24, wherein the laser diode switch element can be placed in an "on" state and in an "off" state, and wherein the signal duration of the modulated output signal maintains the laser diode switch element in the "on" state for a time period that is proportional to the width of a sub-pixel.

26. The printing system of claim 25, wherein the sub-pixel gray levels for a pixel increase in a left-to-right direction.

27. The printing system of claim 25, wherein the sub-pixel gray levels for a pixel increase in a right-to-left direction.

28. The printing system of claim 25, further comprising means for combining a plurality of pixels to comprise at least one cell, wherein the modulated output signal provides a sequence of signals having amplitudes of increasing time duration to the laser diode element to maintain the laser diode element in the "on" state, wherein each of a plurality of successive pixels in a row of the cell contain increasing amounts of sub-pixel gray levels.

29. The printing system of claim 28, wherein the sub-pixel gray levels for the successive pixels in the row increase in a left-to-right direction.

30. The printing system of claim 28, wherein the sub-pixel gray levels for the successive pixels in the row increase in a right-to-left direction.

31. The printing system of claim 28, wherein the sub-pixel gray levels for a pixel in the cell increases in a right-to-left direction.

32. The printing system of claim 28, wherein the sub-pixel gray levels for a pixel in the cell increases in a left-to-right direction.

33. A method for modulating a printer signal for generating separate sub-pixels having sub-pixel gray levels, comprising the steps of:

receiving at least one digital input printer signal that defines at least one pixel having a gray level;

converting the at least one digital input printer signal into an at least one analog printer signal having a signal amplitude level representative of the gray level for the at least one pixel defined in the digital input printer signal;

selecting at least one of a plurality of waveform signals for each pixel from a waveform generator, wherein each of the waveform signals generated by the waveform generator has an at least one separate waveform characteristic; and modulating the at least one analog printer signal by the at least one selected waveform signal to produce a modulated output signal whereby the modulated output signal generates separate sub-pixels having sub-pixel gray levels for each pixel and the width and position of the sub-pixels within a pixel are controlled by the at least one separate waveform characteristic of the at least one selected waveform for that pixel.

34. The method of claim 33, wherein the at least one separate waveform characteristic is comprised of waveform shape.

35. The method of claim 33, wherein the at least one separate waveform characteristic is comprised of waveform shape and orientation.

36. The method of claim 33, wherein the step of selecting at least one of a plurality of waveform signals from a waveform generator comprises the step of selecting at least one of a plurality of waveform signals from a data storage means the stores a plurality of separate waveform signals having an at least one separate waveform characteristic.

37. The method of claim 36, further comprising the step of storing the plurality of separate waveform signals in the data storage means.

38. The method of claim 33, further comprising the step of placing a laser diode switch element in an "on" state or an "off" state based upon the modulated output signal produced by modulating the at least one analog printer signal with the at least one selected waveform, wherein a signal duration of the modulated output signal maintains the laser diode switch element in the "on" state for a time period that is proportional to a width of a sub-pixel.

39. The method of claim 33, wherein the step of selecting at least one of a plurality of waveform signals comprises the step of selecting at least one of a plurality of waveform signals such that the at least one selected waveform signal causes the sub-pixel gray levels for a pixel to increase in a right-to-left direction.

40. The method of claim 33, wherein the step of selecting at least one of a plurality of waveform signals comprises the step of selecting at least one of a plurality of waveform signals such that the at least one selected waveform signal causes the sub-pixel gray levels for a pixel to increase in a left-to-right direction.

41. the method of claim 38, further comprising the step of combining a plurality of pixels to comprise at least one cell, wherein the modulated output signal provides a sequence of signals having amplitudes of increasing time duration to the laser diode element to maintain the laser diode element in the "on" state, wherein each of a plurality of successive pixels in a row of the at least one cell contain increasing amounts of sub-pixel gray levels.

42. The method of claim 41, wherein the step of combining a plurality of pixels to comprise at least one cell wherein each of a plurality of successive pixels in a row of the at least one cell contain increasing amounts of sub-pixel gray levels comprises the step of combining a plurality of pixels to comprise at least one cell wherein each of a plurality of successive pixels in a row of the at least one cell contain increasing amounts of sub-pixel gray levels such that the sub-pixel gray levels for the successive pixels in the row increase in a left-to-right direction.

43. The method of claim 41, wherein the sub-pixel gray levels for the successive pixels in the row increase in a right-to-left direction.

44. The method of claim 41, wherein the step of combining a plurality of pixels to comprise at least one cell wherein each of a plurality of successive pixels in a row of the at least one cell contain increasing amounts of sub-pixel gray levels comprises the step of combining a plurality of pixels to comprise at least one cell wherein each of a plurality of successive pixels in a row of the at least one cell contain increasing amounts of sub-pixel gray levels such that the sub-pixel gray levels for a pixel in the at least one cell increase in a left-to-right direction.

45. The method of claim 41, wherein the step of combining a plurality of pixels to comprise at least one cell wherein each of a plurality of successive pixels in a row of the at least one cell contain increasing amounts of sub-pixel gray levels comprises the step of combining a plurality of pixels to comprise at least one cell wherein each of a plurality of successive pixels in a row of the at least one cell contain increasing amounts of sub-pixel gray levels such that the sub-pixel gray levels for a pixel in the at least one cell increases in a right-to-left direction.

* * * * *